(12) United States Patent
Imaoku et al.

(10) Patent No.: US 8,747,994 B2
(45) Date of Patent: Jun. 10, 2014

(54) ANTI-REFLECTIVE FILM AND PRODUCTION METHOD THEREOF

(75) Inventors: Takao Imaoku, Osaka (JP); Tokio Taguchi, Osaka (JP); Akiyoshi Fujii, Osaka (JP); Kazuhiko Tsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 13/002,699

(22) PCT Filed: Sep. 1, 2009

(86) PCT No.: PCT/JP2009/065271
§ 371 (c)(1),
(2), (4) Date: Jan. 5, 2011

(87) PCT Pub. No.: WO2010/032610
PCT Pub. Date: Mar. 25, 2010

(65) Prior Publication Data
US 2011/0123777 A1 May 26, 2011

(30) Foreign Application Priority Data
Sep. 17, 2008 (JP) .................. 2008-238051

(51) Int. Cl.
*B32B 3/00* (2006.01)
*B32B 3/30* (2006.01)
(52) U.S. Cl.
USPC ............ 428/172; 428/141; 428/156; 428/167
(58) Field of Classification Search
USPC .................. 428/156, 167, 172, 141
See application file for complete search history.

(56) References Cited

U.S. PATENT DOCUMENTS

| 2003/0180476 A1 | 9/2003 | Yamashita et al. |
| 2005/0074579 A1 | 4/2005 | Suzuki et al. |
| 2008/0130122 A1 | 6/2008 | Egi et al. |
| 2008/0265149 A1 | 10/2008 | Endoh et al. |
| 2010/0134892 A1 | 6/2010 | Endoh et al. |

FOREIGN PATENT DOCUMENTS

| JP | 11-305008 | 11/1999 |
| JP | 2003-240903 | 8/2003 |
| JP | 2004-205990 | 7/2004 |
| JP | 2005-31538 A | 2/2005 |
| JP | 2006-018062 | 1/2006 |
| JP | 2007-079392 | 3/2007 |
| JP | 2007-196397 | 8/2007 |
| JP | 2008-194977 | 8/2008 |

(Continued)

OTHER PUBLICATIONS

Stefanov S.I. Reklama I poligrafia: opyt slovaria-spravochnika, M., Gella-print, 2004 "source D65".

(Continued)

*Primary Examiner* — Catharine A Simone
(74) *Attorney, Agent, or Firm* — Nixon & Vanderhye P.C.

(57) ABSTRACT

The present invention provides an anti-reflective film that prevents wavelength dispersion from being applied to light transmitted through an anti-reflective film. The present invention is an anti-reflective film, which reduces reflection of visible light on a surface of a substrate by being mounted on the substrate, has a wavelength dispersion structure for applying first wavelength dispersion to visible light transmitting through the anti-reflective film, and contains a wavelength dispersion material for applying second wavelength dispersion to the visible light transmitting through the anti-reflective film, wherein visible light transmitted through the anti-reflective film has flat transmission wavelength dispersion in a visible light region.

6 Claims, 9 Drawing Sheets

(56) References Cited

FOREIGN PATENT DOCUMENTS

| JP | 2008-209540 | 9/2008 |
| WO | WO 2008/023816 A1 | 2/2008 |
| WO | 2008/069164 A1 | 6/2008 |

OTHER PUBLICATIONS

English Translation of Office Action issued in Russian Application No. 2011107603.

International Search Report for PCT/JP2009/065271, mailed Oct. 13, 2009.

ANTI-REFLECTIVE FILM AND PRODUCTION METHOD THEREOF

This application is the U.S. national phase of International Application No. PCT/JP2009/065271, filed 1 Sep. 2009, which designated the U.S. and claims priority to Japanese Patent Application No. 2008-238051, filed 17 Sep. 2008, the entire contents of each of which are hereby incorporated by reference.

TECHNICAL FIELD

The present invention relates to an anti-reflective film and a production method thereof. More particularly, it relates to an anti-reflective film, which reduces a reflectance of visible light reflected on a surface of a substrate by being mounted on the surface of the substrate of a display panel or the like and thereby conducts anti-reflection for images in a display; and a production method thereof.

BACKGROUND ART

Displays such as CRT (cathode ray tube) displays, LCDs (liquid crystal displays), PDPs (plasma display panels), EL (electroluminescent) displays are each required to have a display surface provided with various functions of scratch-proof, anti-reflection for images, soil-proof, and the like. To the display surface of these displays, protective members such as a protective film are attached in some cases. As this protective film, one showing anti-reflection for images is used, thereby giving the needed functions to the display surface at one time.

It is known that for anti-reflection for images, for example, the protective film is provided with AG (anti-glare) treatment or LR (low reflection) treatment. According to the AG treatment, a pattern of fine grooves is formed on the protective film surface, and by utilizing light scattering effects, the anti-reflection for images is achieved. According to the LR treatment, a film with a refractive index different from that of the protective film is applied on the protective film, and by utilizing the effect of interference of light reflected on the protective film surface and light reflected on the applied film surface, the reflection is reduced (see, for example, Patent Documents 1 and 2).

As a method for forming an uneven pattern such as AG treatment, there is known a technology of imprinting an uneven pattern in accordance with a mold shape onto a thin film by pressing the mold to a thin film applied on the substrate. Upon imprinting the uneven pattern, the thin film is heated or light-radiated. As a method of light radiation, there may be mentioned a method including forming a thin film of ultraviolet curing resin on a transparent substrate, forming an uneven pattern on the thin film by pressing a mold having the uneven pattern on the thin film, curing the thin film by ultraviolet radiation simultaneously, and forming a thin film with the reverse shape of the uneven pattern of the mold on the transparent substrate (see, for example, Patent Document 3).

Meanwhile, as a technology to improve visibility in bright places other than the LR treatment and the AG treatment, an increasing attention has been paid to moth-eye structures, which provide great reflection preventing effect without using the light interference technique. For forming the moth-eye structure on a surface of a product on which the reflection preventing treatment is performed, an uneven pattern at intervals of not more than a wavelength of visible light (for example, 400 nm or shorter), that is much finer than the uneven pattern to be formed by AG treatment, is arranged without any space therebetween so that changes of the refractive index at the border between the outside (air) and the product surface are artificially made sequential. As a result, the product with the moth-eye structure can transmit almost all light regardless of the refractive index interface so that almost all the light reflection on the surface of the object can be avoided (see, for example, Patent Document 4).

[Patent Document 1]
Japanese Kokai Publication Hei-11-305008
[Patent Document 2]
Japanese Kokai Publication No. 2007-79392
[Patent Document 3]
Japanese Kokai Publication No. 2007-196397
[Patent Document 4]
Japanese Kokai Publication No, 2004-205990

SUMMARY OF THE INVENTION

As described above, the anti-reflective film can reduce a reflectance of light reflected on the substrate surface with the anti-reflective film mounted thereon. However, the present inventors have found that the structure, material, and the like of the anti-reflective film satisfying specific conditions cause wavelength dispersion of light transmitted through the anti-reflective film; for example, the anti-reflective film is formed on the surface of the substrate of a display panel, and specific coloration different from a display color may be visually observed in the screen upon looking in the screen.

The present invention was made in view of the above problems and it is an object of the present invention to provide: an anti-reflective film that prevents wavelength dispersion from being applied to light transmitted through an anti-reflective film; and a production method thereof.

The present inventors made various investigations on reasons for wavelength dispersion of light transmitting through an anti-reflective film, and focused on the structure and material of the anti-reflective film. The present inventors have found that even if wavelength dispersion is applied to light transmitting through the anti-reflective film depending on the structure and material of the anti-reflective film, and the anti-reflective film is consequently formed on the surface of the substrate of a display panel to give low reflection effects, coloration is visually observed in a screen. The present inventors have found that by adjusting the respective wavelength dispersion characteristics caused by the structure and material of the anti-reflective film to cancel each other, uneven wavelength dispersion caused by the structure and material is flattened, and thereby wavelength dispersion is less likely to be generated to light transmitted through the anti-reflective film. Further, even if the anti-reflective film is formed on the surface of the substrate of the display panel, the anti-reflective film itself is colorless, and specific coloration different from a display color is less likely to be visually observed. As a result, the above-mentioned problems have been admirably solved, leading to completion of the present invention.

That is, the present invention relates to an anti-reflective film (hereinafter, also referred to as the first anti-reflective film of the present invention), which reduces reflection of visible light on a surface of a substrate by being mounted on the substrate, has a wavelength dispersion structure for applying first wavelength dispersion to visible light transmitting through the anti-reflective film, and contains a wavelength dispersion material for applying second wavelength dispersion to the visible light transmitting through the anti-reflective film, wherein visible light transmitted through the anti-reflective film has flat transmission wavelength dispersion in a visible light region.

The present invention also relates to an anti-reflective film (hereinafter, also referred to as the second anti-reflective film of the invention), which reduces reflection of visible light on a surface of a substrate by being mounted on the substrate, has a wavelength dispersion structure for applying first wavelength dispersion to visible light transmitting through the anti-reflective film, and contains a wavelength dispersion material for applying second wavelength dispersion to the visible light transmitting through the anti-reflective film, wherein transmitted light obtained upon entering the anti-reflective film with light of a standard light source $D_{55}$ is colorless.

Hereinafter, the first and second anti-reflective films will be described in detail.

The anti-reflective film of the present invention is mounted on the substrate, and thereby reduces reflection of visible light on the substrate surface. The principle of the anti-reflective film is not particularly limited as long as the anti-reflective film can reduce reflection of visible light on the substrate surface. Examples thereof include: an LR film that reduces the reflectance by allowing light reflected on the substrate surface and light reflected on the anti-reflective film surface to cancel each other by interference; an AG film that has an uneven pattern on its surface and reduces the reflectance by using light dispersion on the uneven pattern; and a moth-eye film that has an uneven pattern whose pitch p between the adjacent tops is a visible light wavelength or shorter, whose changes of the refractive index at the border between the outside (air) and the substrate surface are artificially made sequential, and which transmits almost all light regardless of the refractive index interface. The structure of the anti-reflective film may be a single-film structure or a multi-film structure. The term "visible light" used herein means light in the wavelength range of 380 nm to 780 nm.

The anti-reflective film has a wavelength dispersion structure for applying first wavelength dispersion to visible light transmitting through the anti-reflective film, and contains a wavelength dispersion material for applying second wavelength dispersion to the visible light transmitting through the anti-reflective film. That is, the anti-reflective film has both characteristics that apply wavelength dispersion to visible light transmitting through the anti-reflective film caused by the structure of the anti-reflective film and characteristics that apply wavelength dispersion to visible light transmitting through the anti-reflective film caused by the material of the anti-reflective film. The "wavelength dispersion" used herein refers to characteristics in which the fluctuations of the transmittance of light transmitting through the anti-reflective film are 0.5% or higher around the transmittance in a wavelength of 550 nm. In the present description, the wavelength dispersion to transmitting light based on the wavelength dispersion structure is the first wavelength dispersion, and the wavelength dispersion to transmitting light based on the wavelength dispersion material is the second wavelength dispersion. In the present invention, the fluctuations of at least one of the first wavelength dispersion and the second wavelength dispersion are preferably 1.0% or higher. At this time, the anti-reflective film is formed on the surface of the substrate of the display panel, and coloration is more likely to be visually observed in a screen. The fluctuations of the first wavelength dispersion and the second wavelength dispersion are more preferably 2.0% or higher.

In the first anti-reflective film of the present invention, the visible light transmitted through the anti-reflective film has flat transmission wavelength dispersion in a visible light range. The expression "has flat transmission wavelength dispersion in a visible light range" means that the fluctuations of the transmittance of light transmitted through the anti-reflective film in a visible light region (a wavelength of 380 to 780 nm) is lower than 0.5% around the transmittance in a wavelength of 550 nm. In the present invention, the first wavelength dispersion and the second the wavelength dispersion are mixed to give total wavelength dispersion characteristics. Then, the transmittance based on the first wavelength dispersion and the transmittance based on the second wavelength dispersion are added up to give the respective wavelength components a uniform transmittance in a visible light range as a whole. When the anti-reflective film is formed on the surface of the substrate of a display panel, for example, coloration in a screen based on the anti-reflective film is prevented, and the display quality improvement effect can be obtained. The fluctuations of the transmittance in a visible light region are preferably lower than 0.2%, and more preferably lower than 0.1%. Thereby, the coloration preventing effect is markedly improved.

In the second anti-reflective film of the present invention, transmitted light obtained upon entering the anti-reflective film with light of a standard light source $D_{65}$ is colorless. Namely, it is sufficient to give the conditions judged to be colorless when spectrocolorimetry of the transmitted light of the anti-reflective film is performed with the standard light source $D_{65}$. More specifically, the following formulae are satisfied on the xy chromaticity diagram.

$x=0.3127\pm0.0003(0.3124<x<0.3130)$ $y=0.329\pm0.0003(0.3287<y<0.3293)$

The following formulae are preferably satisfied.

$x=0.3127\pm0.0001(0.3126<x<0.3128)$ $y=0.329\pm0.0001(0.3289<y<0.3291)$

The following formulae are satisfied on the a*b* chromaticity diagram.

$a*=0\pm0.05(-0.05<a*<0.05)$ $b*=0\pm0.05(-0.05<b*<0.05)$

The following formulae are preferably satisfied.

$a*=0\pm0.03(-0.03<a*<0.03)$ $b*=0\pm0.03(-0.03<b*<0.03)$

When the anti-reflective film is formed on the surface of the substrate of the display panel, for example, coloration in a screen based on the anti-reflective film is prevented, and the display quality improvement effect can be obtained.

The configuration of the anti-reflective film of the present invention is not particularly limited as long as it essentially includes such components. The anti-reflective film may or may not include other components. The anti-reflective film, for example, may partially have a structure without wavelength dispersion characteristics, and may partially contain a material without wavelength dispersion characteristics. When the first and second anti-reflective films of the present invention are used for a display device, the light source of the display device is not limited to the standard light source $D_{65}$, and may be an A light source, a C light source, or a backlight light source having wavelength dispersion characteristics such as a fluorescent light.

Preferable embodiments of the anti-reflective film of the present invention are mentioned in more detail below.

It is preferable that the anti-reflective film comprises: an uneven part including a plurality of projections; and a base part, wherein the uneven part is the wavelength dispersion structure. When the anti-reflective film has the plurality of projections, low reflection characteristics can be obtained effectively as in the aforementioned AG film or moth-eye film. When the anti-reflective film has the base part, an uneven part can be formed easily and precisely only by forming the uneven part on the surface of the flat film that is to be used as a base. It is to be noted that when the anti-reflective film is made of the uneven part and the base part, the uneven part is more likely to have first wavelength dispersion based on the wavelength dispersion structure, and the base part is more likely to have second wavelength dispersion based on the wavelength dispersion material. However, the present invention enables the first wavelength dispersion and the second wavelength dispersion to cancel each other. Accordingly, even if the uneven part and the base part are formed in the anti-reflective film, display coloration based on the above structure can be prevented. The uneven part is preferably formed on the surface of (outside) the anti-reflective film in terms of anti-reflection.

It is preferable that a pitch between tops of adjacent projections of the plurality of projections is a visible light wavelength or shorter. That is, the anti-reflective film of the present embodiment is a moth-eye film with a fine uneven pattern formed on the surface thereof. The "visible light wavelength or shorter" used herein refers to a wavelength of 380 nm or shorter. The moth-eye film can transmit almost all light incident from the outside. Therefore, according to the present embodiment, even if the moth-eye film is used on the substrate of the display panel, an anti-reflective film whose coloration in a screen is less likely to be visually observed and which shows anti-reflection for images based on light reflection can be obtained.

In the case where the pitch between tops of adjacent projections of the plurality of projections is a visible light wavelength or shorter, it is preferable that a rate of a height h from the top to the bottom point of a projection to the pitch p between the tops of adjacent projections of the plurality of projections is $0.1<h/p<5.0$. It is more preferable that the rate is $0.5<h/p<2.0$. As the aspect ratio (height h/pitch p) of one projection out of the plurality of projections forming the uneven part decreases, the transmittances of light (orange, red, and the like colors) on a longer wavelength side out of the transmittances of visible light transmitted through the anti-reflective film may fall. That is, an even part with such an aspect ratio tends to have the wavelength dispersion structure. In the present embodiment, the first wavelength dispersion of the wavelength dispersion structure and the second wavelength dispersion of the wavelength dispersion material mainly forming a base part other than the uneven part are adjusted to cancel each other. With such an aspect ratio, an uneven part with higher surface tolerance can be formed. According to the present embodiment, an anti-reflective film in which coloration is less likely to be visually observed in a screen can be obtained even when used on the substrate of the display panel.

It is preferable that the wavelength dispersion material is a visible light-curable material. One example of the material suitable for forming the anti-reflective film is resin. Resin curable under predetermined conditions is particularly preferable. By using such resin as a material, an uneven pattern is formed on the surface of the film that is to be used as a base, and then the uneven pattern is fixed by a curing treatment to easily produce an uneven pattern. Such a molding means makes it possible to produce, with high definition, a fine uneven pattern in which a pitch between tops of adjacent projections of the plurality of projections is a visible light wavelength or shorter (nanometer size) as described above.

Examples of the resin curable under predetermined conditions include thermosetting resin and photo-curable resin. Photo-curable resin can be treated at ordinary temperature. Thus, various curable resin materials can be used as the material of the anti-reflective film, and in particular, visible light-curable material is preferably used. The coloration, a problem to be solved by the present invention, is coloration of light in a visible light wavelength region, and the visible light-curable component has both a light-transmitting wavelength region and a light absorbing wavelength region in a visible light wavelength region. Examples of the visible light-curable material include monomers initiating polymerization by visible light absorption, and a mixture of monomers not initiating polymerization by visible light absorption alone but including a polymerization initiator that can become an active species by visible light absorption to initiate polymerization and the polymerization initiator. Examples of the photo-polymerization reaction in this case include radical polymerization, ionic polymerization (e.g. anionic polymerization and cationic polymerization), and ring-opening polymerization.

It is preferable that the visible light-curable material includes a visible light polymerization initiator. It is possible to easily control wavelength dispersion characteristics with a material containing the visible light polymerization initiator as the wavelength dispersion material only by adjusting the kind, the amount (concentration), and the like of the visible light polymerization initiator. Thus, the coloration can be removed more easily and precisely. In addition, the visible light polymerization initiator triggers a polymerization reaction, and provides more choices of materials of the anti-reflective film. Thereby, it is possible to choose a material suitable for controlling the anti-reflective film with a desired thickness, and the coloration is more easily removed.

The present invention also relates to an anti-reflective film (hereinafter, also referred to as the third anti-reflective film of the invention), which reduces reflection of visible light on a surface of a substrate by being mounted on the substrate, has a wavelength dispersion structure for applying third wavelength dispersion to visible light upon reflection on the surface of the anti-reflective film, and contains a wavelength dispersion material for applying second wavelength dispersion to visible light transmitting through the anti-reflective film, wherein light has flat wavelength dispersion in a visible light region, the light including visible light reflected on the surface of the anti-reflective film and visible light that is incident from a side of the substrate and transmitted through the anti-reflective film. The present inventors have found that when the structure of the anti-reflective film, in addition to wavelength dispersion characteristics to transmitted light of the wavelength dispersion structure, satisfies predetermined conditions, a specific wavelength component is reflected on the surface of the anti-reflective film, and coloration based on the wavelength component arise in a display screen. In the present description, the wavelength dispersion applied to reflected light based on the structure of the anti-reflective film is defined as the third wavelength dispersion. In the third anti-reflective film of the present invention, the third wavelength dispersion and the second wavelength dispersion are canceled with each other with a wavelength dispersion material that applies the second wavelength dispersion to visible light transmitting through the anti-reflective film on the same principle as described above. That is, in the third anti-reflective film of the present invention, the third wavelength dispersion and the second wavelength dispersion are canceled with each other thereby to give a uniform intensity of light in a visible light region, the light including light reflected on the surface of the anti-reflective film and light transmitted through the anti-reflective film. Visible light reflected on the surface of the anti-reflective film is different in origin from visible light that is incident from a side of the substrate and transmitted through the anti-reflective film. In consideration of each intensity ratio, it is necessary to adjust the assembled light to give a uniform intensity in a visible light region. Thereby, display coloration based on the reflected light can be removed, and an anti-reflective film that enables favorable display as a whole can be obtained.

The present invention also relates to an anti-reflective film (hereinafter, also referred to as the fourth anti-reflective film of the invention), which reduces reflection of visible light on a surface of a substrate by being mounted on the substrate, has a wavelength dispersion structure for applying third wavelength dispersion to visible light upon reflection on the surface of the anti-reflective film and applying first wavelength dispersion to visible light transmitting through the anti-reflective film, and contains a wavelength dispersion material for applying second wavelength dispersion to the visible light transmitting through the anti-reflective film, wherein light has flat wavelength dispersion in a visible light range, the light including visible light reflected on the surface of the anti-reflective film and visible light that is incident from a side of the substrate and transmitted through the anti-reflective film. The present inventors have further found that the aforementioned first, second, and third wavelength dispersion may occur simultaneously, and coloration based on these wavelengths may occur in a display screen. That is, in the fourth anti-reflective film of the present invention, the third wavelength dispersion, the first wavelength dispersion, and the second wavelength dispersion are canceled with each other on the same principle as described above thereby to give a uniform intensity of light in a visible light region, the light including light reflected on the surface of the anti-reflective film and light transmitted through the anti-reflective film. Visible light reflected on the surface of the anti-reflective film is different in origin from visible light incident from the side of the substrate and transmitted through the anti-reflective film. In consideration of each intensity ratio, it is necessary to adjust the assembled light to give uniform light in a visible light region. Thereby, display coloration based on the structure and material of the anti-reflective film can be removed, and an anti-reflective film that enables favorable display as a whole can be obtained.

The present invention further relates to a production method of an anti-reflective film, the method comprising: a first step of applying a visible light-curable resin on a substrate containing a UV-absorbing component to form a film; a second step of forming an uneven part on a surface of the film to form a film including a plurality of projections, a pitch between the tops of adjacent projections being a visible light wavelength or shorter; and a third step of irradiating the film with visible light from a side of a substrate and thereby curing the film having the uneven part to form an anti-reflective film, wherein the anti-reflective film reduces reflection of the visible light on a surface of the substrate by being mounted on the substrate. Use of the substrate containing an ultraviolet absorption component can prevent a polarizer made of PVA (Poly Vinyl Alcohol) or the like in the polarizing plate from being degraded by ultraviolet rays in the case where the substrate is a polarizing plate, for example. Nevertheless, in the case where the uneven part is formed by pressing a mold with a light blocking effect, a curing treatment cannot be performed by light radiation from the film surface side. However, according to the production method of the present invention, a film is hardened with visible light. Accordingly, even if the substrate contains the UV-absorbing component, the film can be hardened by light radiation from the back side (substrate side) of the film. Thereby, a curing treatment can be performed simultaneously upon formation of an uneven part, and therefore a structure with high precision can be formed even in an uneven pattern such as moth-eye in which the pitch between the tops of adjacent projections is a visible light wavelength or shorter.

EFFECT OF THE INVENTION

According to the present invention, wavelength dispersion of the structure itself of an anti-reflective film and wavelength dispersion of the material itself of the antireflective film are adjusted to cancel each other. Accordingly, when the anti-reflective film is formed on the surface of a substrate of a display panel, anti-reflection effects of the anti-reflective film can be obtained, and coloration in a display can be prevented.

PREFERRED EMBODIMENTS

Figure 1:
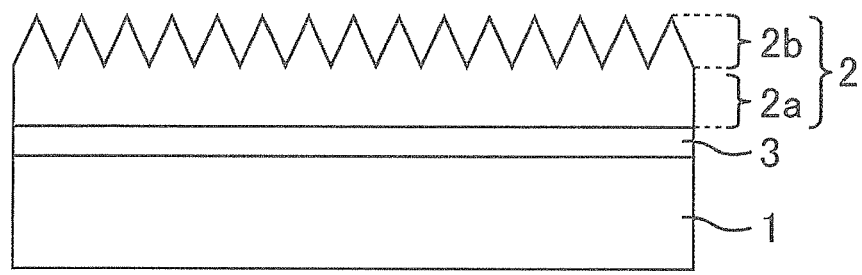
FIG. 1 is a cross-sectional view schematically illustrating an anti-reflective film of Embodiment 1.

The present invention will be mentioned in more detail referring to the drawings in the following embodiments, but is not limited to these embodiments.

Embodiment 1

FIG. 1 is a cross-sectional view schematically illustrating an anti-reflective film of Embodiment 1. As illustrated in FIG. 1, the anti-reflective film of Embodiment 1 is mounted on a TAC (Tri Acetyl Cellulose) film that serves as a substrate 1 forming the surface of a display panel, and reduces visible light reflection on the surface of a substrate 1. An anti-reflective film 2 of Embodiment 1 comprises an uneven part (moth-eye) 2b including a plurality of projections formed on the surface side (outside); and a base part 2a forming a back side (substrate side). The anti-reflective film 2 is attached to the substrate 1 with an adhesive layer 3 interposed therebetween. The pitch p between tops of adjacent projections of the plurality of projections forming the uneven part 2b is 40 nm to 300 nm. A height h from the top to the bottom point of one projection out of a plurality of projections forming the uneven part 2b is set in a range of 30 nm to 200 nm, and an aspect ratio of one projection is set in a range of 0.1<h/p<5.0. The anti-reflective film 2 is composed of a UV-curable resin layer with a thickness of about 10 µm. The adhesive layer 3 is composed of a primer resin layer with a thickness of 10 µm to 15 µm.

The uneven part 2b of the anti-reflective film 2 of Embodiment 1 has a wavelength dispersion structure, and applies predetermined wavelength dispersion (first wavelength dispersion) to light transmitting through the uneven part 2b. The anti-reflective film 2 is made of a wavelength dispersion material, which applies predetermined wavelength dispersion (second wavelength dispersion) to light transmitting through the anti-reflective film 2. In general, the second wavelength dispersion has wavelength dispersion characteristics opposite to the first wavelength dispersion in order to cancel the first wavelength dispersion caused by the uneven part 2b formed on the surface of the anti-reflective film 2 with the second wavelength dispersion caused by the material of the anti-reflective film 2. Thus, the first wavelength dispersion and second wavelength dispersion can be adjusted to cancel each other, so that the anti-reflective film has flat wavelength dispersion characteristics as a whole. The wavelength dispersion characteristics of the base part 2a that occupies a large fraction of the volume of the anti-reflective film, not the uneven part 2b having a small volume, greatly contributes to the application of the second wavelength dispersion based on a wavelength dispersion material.

A moth-eye film is used as the anti-reflective film 2 of Embodiment 1, and an LR film and an AG film may be used instead of the moth-eye film. In the AG film, an uneven part is formed, as described above, and therefore may have a wavelength dispersion structure, which applies predetermined wavelength dispersion to visible light transmitting through the uneven part, depending on the shape of the uneven part. The LR film may form a wavelength dispersion structure because it may apply predetermined wavelength dispersion to visible light transmitting through the uneven part by formation of a plurality of layers with different refractive indices.

Figure 2:
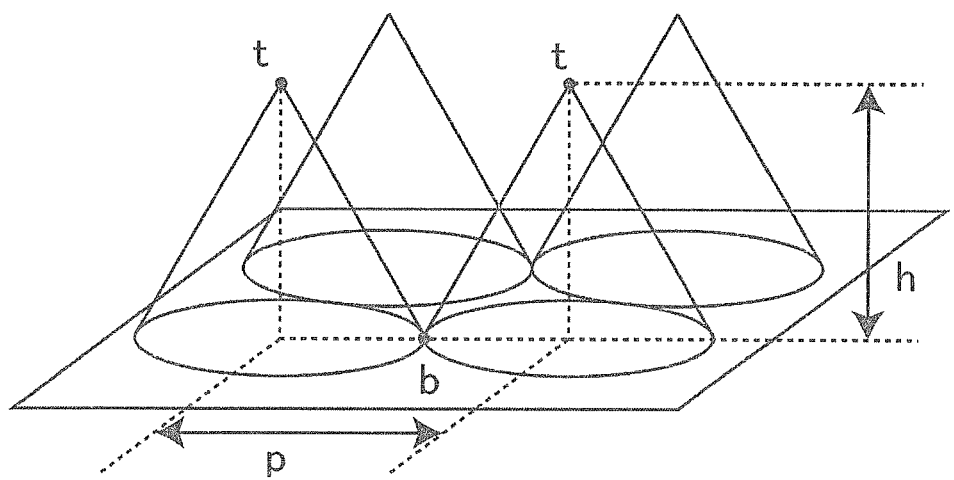
FIG. 2 is an enlarged perspective view of an uneven part of the anti-reflective film of Embodiment 1 in the case where the unit structure of the projections is a cone.
Figure 3:
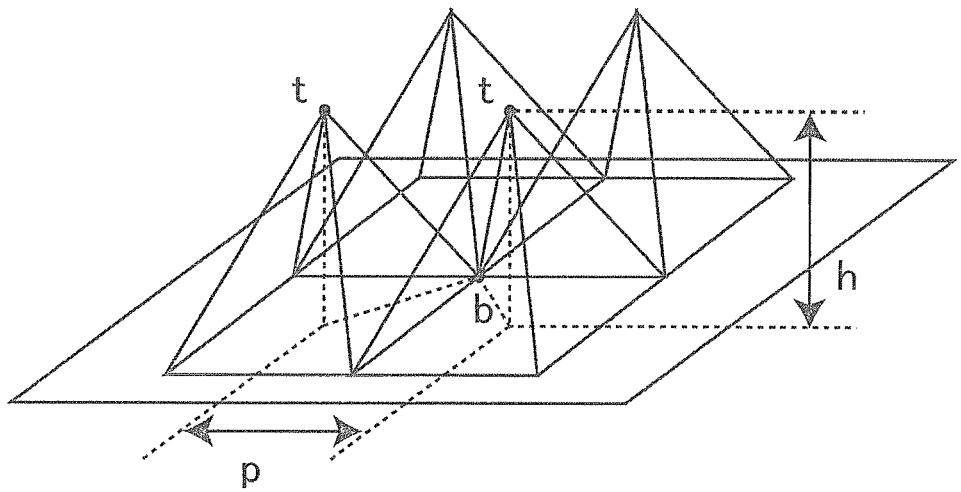
FIG. 3 is an enlarged perspective view of an uneven part of the anti-reflective film of Embodiment 1 in the case where the unit structure of the projections is a quadrangular pyramid.
Figure 4:
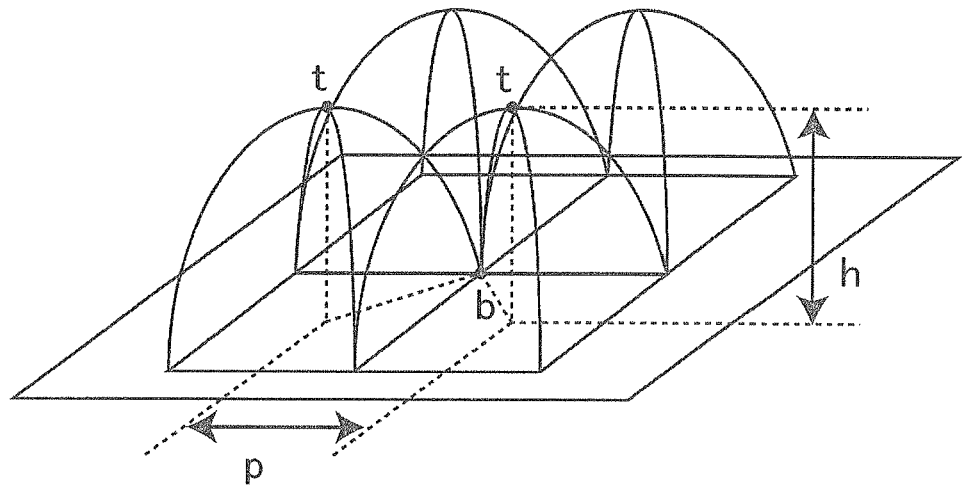
FIG. 4 is an enlarged perspective view of an uneven part of the anti-reflective film of Embodiment 1 in the case where the unit structure of the projections is a dome (bell) shape that has outwardly-bowed side faces from the square base to the top.
Figure 5:
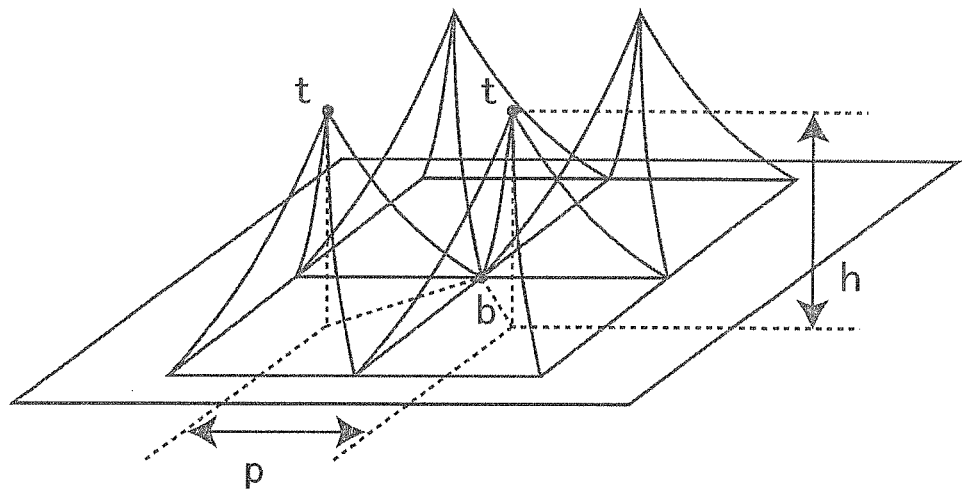
FIG. 5 is an enlarged perspective view of an uneven part of the anti-reflective film of Embodiment 1 in the case where the unit structure of the projections is a needle shape that has inwardly-bowed side faces from the square base to the top.

The case where the anti-reflective film 2 of Embodiment 1 is a moth-eye film will be described in detail. FIGS. 2 to 5 are each an enlarged perspective view of an uneven part of the anti-reflective film of Embodiment 1. FIG. 2 is the case where the unit structure of the projections is conical, FIG. 3 is the case where the unit structure of the projections is a quadrangular pyramid, FIG. 4 is the case where the unit structure of the projections is a dome (bell) that has outwardly-bowed side faces from the square base to the top, and FIG. 5 is the case where the unit structure of the projections is a needle shape that has inwardly-bowed side faces from the square base to the top. As illustrated in FIGS. 2 to 5, a tip of the projection is a top t and a point at which the adjacent projections contact each other is a bottom point b. A pitch p between the adjacent tops of the projections is defined as a pitch between two points where perpendicular lines from the respective tops t come in contact with a single plane surface. A height h from the top t to the bottom point b is defined as a distance from the top t of the projection to the plane surface having the bottom point b thereon. Namely, the aspect ratio of one projection is defined as h/p obtained by dividing the height by the pitch (pitch between the tops).

The pitch p between adjacent tops of the projections is 380 nm or less, preferably 300 nm or less, and more preferably 200 nm or less. In FIGS. 2 to 5, a cone and a quadrangular pyramid, a dome (bell), and a needle shape are illustrated as a unit structure of the projection. However, the unit structure is not particularly limited as long as the anti-reflective film 2 of Embodiment 1 is a moth-eye film, and an uneven part has tops and bottom points formed, and the pitch is limited to the visible light wavelength or shorter. Moreover, the unit structure may include a shape in which the slanted surface of a cone has a stair step, for example.

Figure 6:
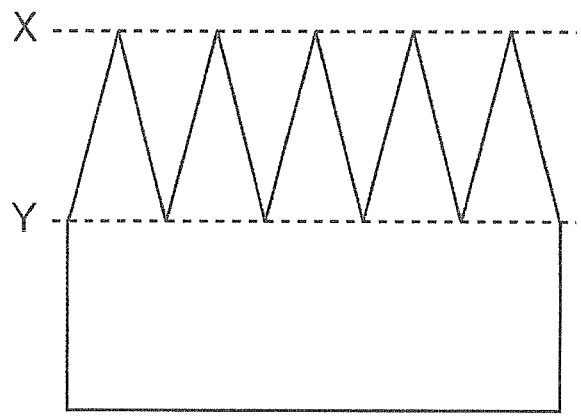
FIG. 6 is a view schematically showing the principle of how a moth-eye film achieves low reflection and illustrating a cross-sectional structure of the moth-eye film.
Figure 7:
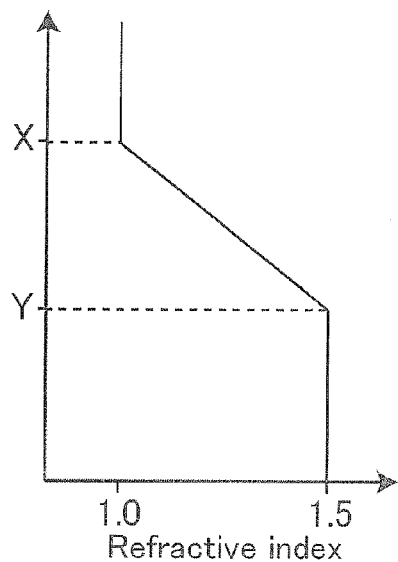
FIG. 7 is a view schematically showing the principle of how a moth-eye film achieves low reflection and showing the refractive index of light that enters the moth-eye film.

The following description will discuss a principle of the ability of the moth-eye film to achieve low reflection. FIG. 6 and FIG. 7 are each a view schematically showing the principle of how the moth-eye film achieves low reflection. FIG. 6 illustrates a cross-sectional structure of the moth-eye film, and FIG. 7 shows the refractive index of light that enters the moth-eye film. When light passes from one medium to a different medium, the light is refracted, transmitted, and reflected on an interface between the mediums. The angle of refraction, and the like depend on the refractive index of the medium into which the light proceeds. For example, when the medium is air or a resin, the refractive index is about 1.0 or about 1.5, respectively. In Embodiment 1, on the whole, the unit structure of the uneven part 3 formed on the surface of the moth-eye film has a drill shape, i.e., a shape in which the width gradually decreases toward the tip end. As shown in FIG. 7, in the projections (between X and Y) located at an interface between an air layer and the moth-eye film, the refractive index is considered to continuously and gradually increase from about 1.0 as the refractive index of air to the refractive index of the film forming material (about 1.5 in case of resin). The amount of light reflection depends onto the difference between the refractive indices of those mediums, and thus most light passes through the moth-eye film by artificially creating a condition of substantial absence of the refractive interface as described earlier. As a result, the reflective index on the surface of the film is reduced significantly.

In Embodiment 1, the TAC film forming the surface of the display panel is used as the substrate 1, and is not particularly limited as long as the anti-reflective film can be mounted thereon. The TAC film serves as a member forming a polarizing plate, and particularly a protective member of a polarizer, for example. Examples of the substrate on which the anti-reflective film is to be mounted include an acrylic protective plate, a hard coat layer disposed on the surface of the polarizing plate, and an AG layer disposed on the surface of the polarizing plate.

When the wavelength dispersion which the uneven part 2b of the anti-reflective film 2 applies to the transmitted light is determined, the transmittance of each wavelength component in the uneven part 2b needs to be measured. The transmittance (%) was calculated by measuring the reflectance of each wavelength component in the uneven part 2b of the anti-reflective film 2, and then subtracting the reflectance (%) from the whole (100%). When light enters a different medium, light is decomposed into a reflected component reflected at a medium interface, a transmitted component transmitted through the medium, and an absorbing component absorbed by the medium. The volume of the uneven part 2b (absorption region) is only a small fraction of the entire volume of the anti-reflective film 2 (absorption region), and the base part 2a is the main absorption region. Accordingly, if the absorbing component is ideally assumed to be 0, the following equation is obtained.

Reflectance (%)+transmittance (%)=100% Therefore, the transmittance can be calculated from the reflectance in the uneven part 2b of the anti-reflective film 2. In addition, the change in reflectance resulting from the uneven part 2b shows a tendency contrary to the change in transmittance.

Hereinafter, the anti-reflective film of Example 1 will be specifically produced as an example of Embodiment 1, and the measurement results of transmittance will be shown. The reflectance of the uneven part of the anti-reflective film was measured with a spectral colorimetric meter (trade name: CM-2002, product of Konica Minolta Holdings, Inc.). As the measuring conditions, a $D_{65}$ light source was used as a light source, and the SCE method (specular reflection component removal) and d/8 method (diffused lighting, light receiving angle of 8°) were employed. The profile of the uneven part of the anti-reflective film is as follows. The pitch p between the tops of adjacent projections of the plurality of projections was set to 200 nm, and the height h from the top to the bottom point of one projection was set to 90 nm. That is, the aspect ratio (h/p) of one projection of the uneven part on which reflected light was measured was 0.45.

Figure 8:
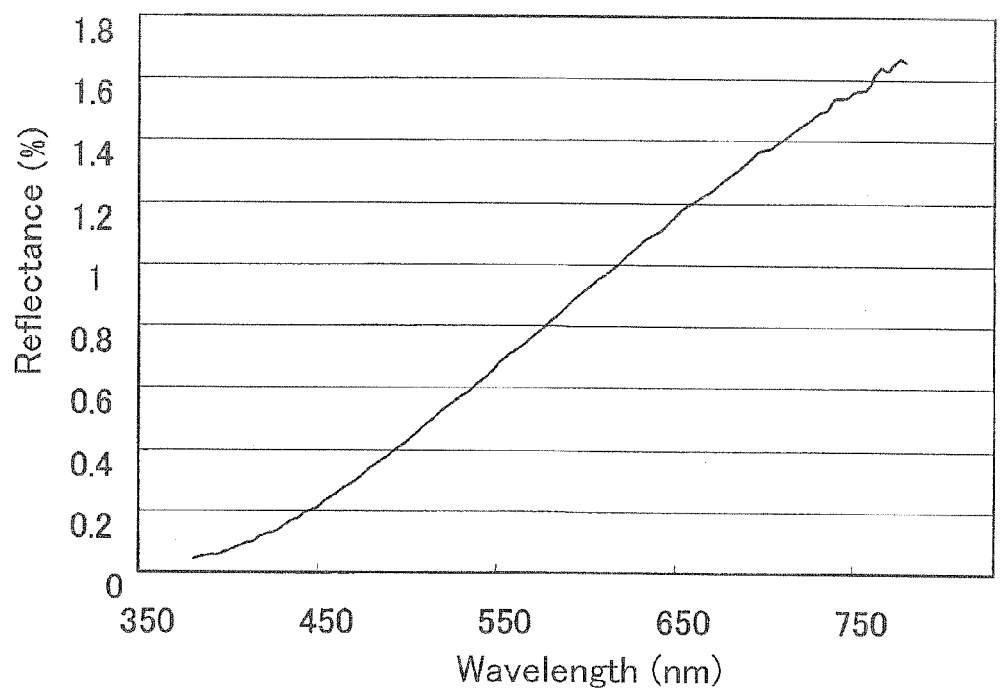
FIG. 8 is a graph that shows wavelength dispersion characteristics of reflected light on the uneven part of the anti-reflective film (wavelength dispersion structure).

FIG. 8 is a graph that shows wavelength dispersion characteristics of reflected light on the uneven part of the anti-reflective film (wavelength dispersion structure). As shown in FIG. 8, the reflectance based on the visible light reflected on the surface of the uneven part gradually increases from 380 nm (the lower limit of the wavelength in a visible light wavelength region) to 780 nm (the upper limit of the wavelength in the visible light wavelength region). The reflectance of a 380-nm wavelength component was about 0.1%, and the reflectance of a 780-nm wavelength component was about 0.8%.

Figure 9:
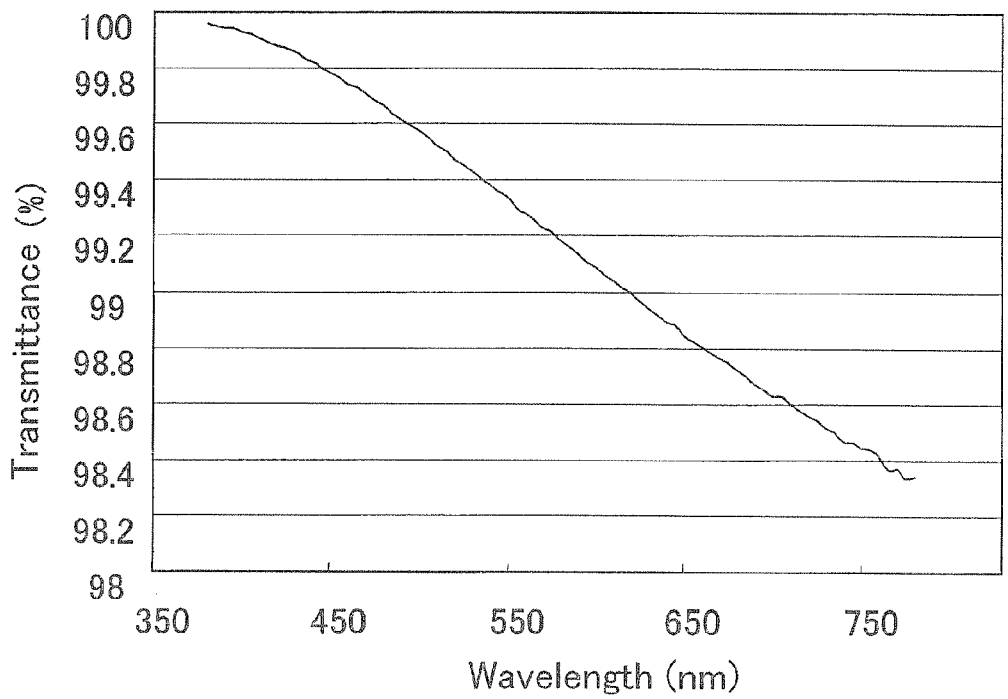
FIG. 9 is a graph that shows wavelength dispersion characteristics to transmitted light on the uneven part of the anti-reflective film (wavelength dispersion structure).

FIG. 9 is a graph that shows wavelength dispersion characteristics to the transmitted light based on the uneven part of the anti-reflective film (wavelength dispersion structure). As shown in FIG. 9, the transmittance of the visible light transmitted through the uneven part gradually decreases from 380 nm (the lower limit of the wavelength in the visible light wavelength region) to 780 nm (the upper limit of the wavelength in the visible light wavelength region). The transmittance of the 380-nm wavelength component was about 99.9%, and the transmittance of the 780-nm wavelength component was about 99.2%.

In order to select the material of the anti-reflective film or adjust the material conditions for cancellation of the wavelength dispersion caused by the structure of the anti-reflective film, or in order to design the structure of the anti-reflective film for cancellation of the wavelength dispersion caused by the material of the anti-reflective film, it is ideally necessary to form spectral characteristics that show the wavelength dispersion in contrast to spectral characteristics that show the wavelength dispersion of the transmitted light shown in FIG. 9, with respect to the wavelength axis (x axis). That is, the anti-reflective film has flat wavelength dispersion characteristics when the spectrum in contrast to the transmitted light spectrum of FIG. 9, i.e., the spectrum having similar spectral characteristics as those of the reflected light spectrum of FIG. 8 is adjusted with the material of the anti-reflective film. When the anti-reflective film in which each wavelength component has flat transmission wavelength dispersion in the visible light range is used, coloration of display light is not visually observed based on the anti-reflective film even if the anti-reflective film is mounted on the substrate of the display panel. It is actually almost impossible to form an anti-reflective film that has completely symmetrical wavelength dispersion characteristics. However, coloration effects of display light can be sufficiently exerted even if completely symmetrical wavelength dispersion characteristics are not combined. In Embodiment 1, it is sufficient that the change rate of the transmittance of the light transmitted through the anti-reflective film is less than 0.5% around the transmittance in a wavelength of 550 nm in the visible light range (380 nm to 780 nm).

The balance that cancels wavelength dispersion characteristics with each other can be adjusted by Lambert-Beer Law. The intensity of light that enters a light-absorbing medium and is emitted through the medium is represented by the following equation where the incident light intensity is Iin (λ), the outgoing light intensity is Iout (λ), the concentration of the light-absorbing medium is c, the absorption coefficient of the light-absorbing medium is α (λ), and the thickness (light path length) of the medium is d.

$$Iin(\lambda)=Iin(\lambda)\times\exp(-\alpha(\lambda)\times c\times d)$$

If both sides of the above equation are divided by Iin (λ), the following equation is obtained.

$$Iin(\lambda)/Iin(\lambda)=\exp(-\alpha(\lambda)\times c\times d)$$

In the left side, the outgoing light intensity is divided by the incident light intensity. Namely, the left side represents a transmittance. The following equation is obtained where the transmittance is T (λ).

$$T(\lambda)=\exp(-\alpha(\lambda)\times c\times d)$$

The higher the concentration c of the light-absorbing medium, the absorption coefficient α (λ) of the light-absorbing medium, or the thickness (light path length) d of the medium is, the lower the transmittance T (λ) is. The transmittance can be adjusted by this change in value.

As described above, when light enters a different medium, light is decomposed into a reflected component reflected at a medium interface, a transmitted component transmitted through the medium, and an absorbing component absorbed by the medium. The upper part of the anti-reflective film 2 of Embodiment 1 is formed of the uneven part 2b, which serves as the main reflective region. As described above, the base part 2a is the main absorption region. Then, if the reflected component is ideally assumed to be 0, the following equation is obtained.

$$\text{Absorption rate}(\%)+\text{transmittance}(\%)=100\%$$

Accordingly, the change in transmittance caused by the base part of the anti-reflective film depends on light absorption characteristics and transmittance characteristics of the material of the anti-reflective film. When an uneven part having reflection characteristics of the graph shown in FIG. 9 in which the transmittance of visible light transmitted through the uneven part gradually decreases from the short wavelength side to the long wavelength side is formed, the anti-reflective film is formed with the material having transmittance characteristics in which the transmittance of visible light transmitted through the uneven part gradually increases from the short wavelength side to the long wavelength side, as shown in FIG. 8, to give flat wavelength dispersion as a whole. According to the above formula, the absorption rate and the transmittance show opposite tendencies. In Embodiment 1, the material whose absorption characteristics gradually decrease from the short wavelength side to the long wavelength side is used.

In Embodiment 1, coloration based on the design of the uneven part (moth-eye) is removed by adjusting the concentration of the wavelength dispersion material in the material of the anti-reflective film and/or the thickness of the anti-reflective film. On the contrary, with respect to coloration based on the wavelength dispersion characteristics of the material of the anti-reflective film, the design of the uneven part (moth-eye) may be adjusted.

Figure 10:
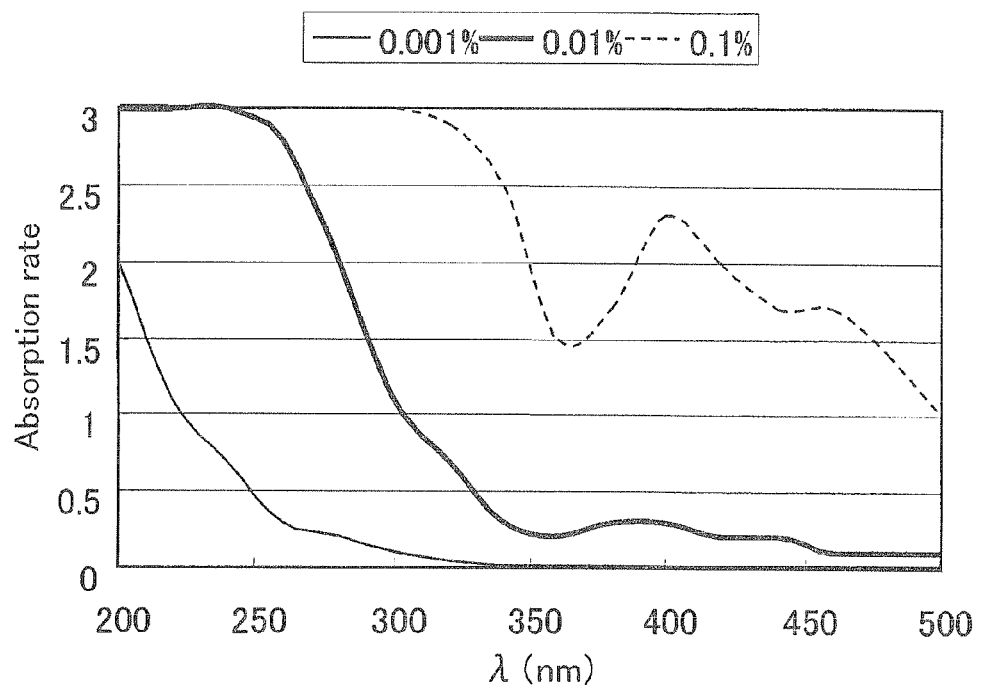
FIG. 10 is a graph that shows absorption characteristics of the material of the anti-reflective film of Embodiment 1.

FIG. 10 is a graph that shows absorption characteristics of the material (wavelength dispersion material) of the anti-reflective film of Embodiment 1. In Embodiment 1, the anti-reflective film is made of a visible light curable material and specifically comprises a visible light polymerization initiator (trade name: IRGACURE784, product of Ciba Specialty Chemicals Inc.). The following chemical formula (I) is the chemical formula of IRGACURE784. IRGACURE784 is a titanocene photopolymerization initiator and has a molecular weight of 534.4. FIG. 10 shows absorption characteristics of IRGACURE784 in an acetonitrile solution. Each curve shows a sample with a different concentration. Specifically, the concentration of each curve is 0.001%, 0.01%, and 0.1% from the left. Each concentration is % by weight of IRGACURE784 in the acetonitrile solution. As shown in FIG. 10, the wavelength dispersion changes with the concentration. In Embodiment 1, the wavelength dispersion based on the material of the anti-reflective film can be effectively adjusted in a range of 0.3 to 10% by weight based on the material of the anti-reflective film.

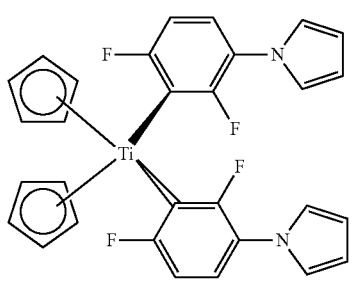

(1)

Figure 11:
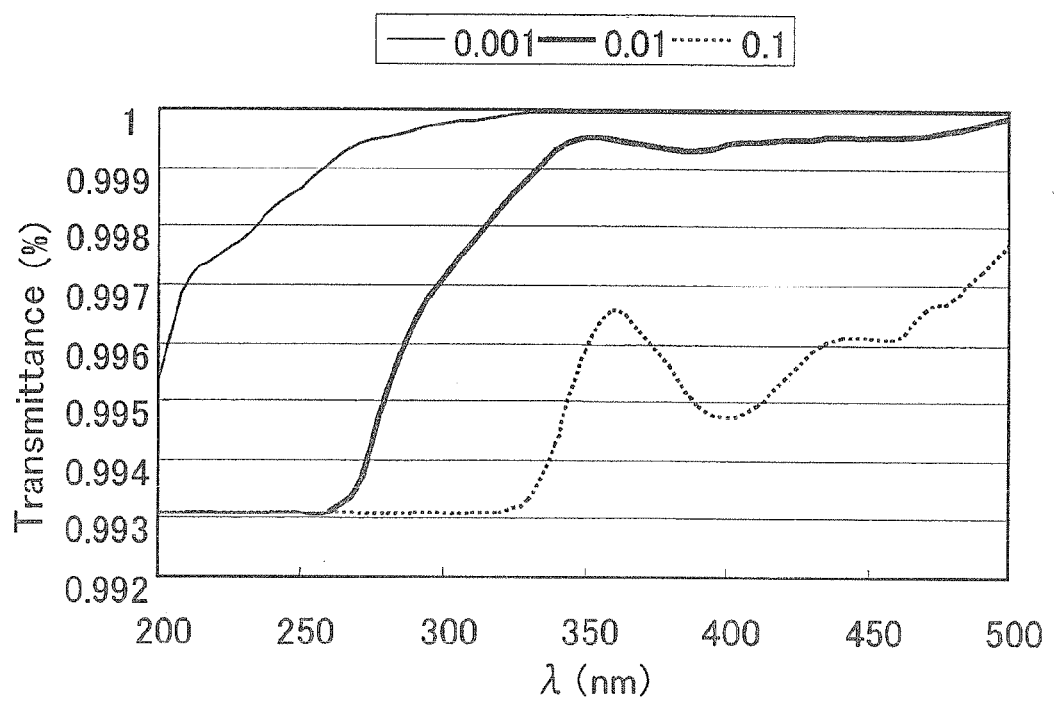
FIG. 11 is a graph that shows transmittance characteristics of the material of the anti-reflective film of Embodiment 1.

FIG. 11 is a graph that shows transmittance characteristics of the material (wavelength dispersion material) of the anti-reflective film of Embodiment 1. That is, FIG. 11 is a graph that shows wavelength dispersion characteristics applied to light transmitting through the anti-reflective film of Embodiment 1. Each curve shows a sample with a different concentration. Specifically, the thickness of the anti-reflective film shown by each curve is 0.001 m, 0.01 m, and 0.1 m from the left. As shown in FIG. 11, the wavelength dispersion changes with the thickness.

As shown in FIG. 10, light absorption properties of IRGACURE784 gradually decreases from the short wavelength side to the long wavelength side. As shown in FIG. 11, light absorption properties of IRGACURE784 gradually increases from the short wavelength side to the long wavelength side. As described above, the transmittance of visible light transmitting through the uneven part gradually increases from the short wavelength side to the long wavelength side. Accordingly, by using, as the material of the anti-reflective film, the visible light polymerizing agent such as IRGACURE784 having a transmittance that gradually increases from the short wavelength side to the long wavelength side, the wavelength dispersion to transmitting light based on the structure of the anti-reflective film cancels the wavelength dispersion to transmitting light based on the material of the anti-reflective film to give flat wavelength dispersion as a whole.

More specifically, the entire balance can be adjusted by optimizing the concentration c of IRGACURE784 in the UV-curable resin layer and the thickness of the UV-curable resin layer forming the base part of the anti-reflective film. In the case where the aspect ratio is a value other than 0.45 mentioned above, the wavelength dispersion characteristics (transmitted light spectrum) based on the aspect ratio is first determined, and each parameter (concentration and thickness) that specifies the wavelength dispersion characteristics of the visible light polymerizing agent is distributed so as to give flat wavelength dispersion of light transmitted through the anti-reflective film. The visible light polymerizing agent contained in the UV-curable resin layer is not limited to IRGACURE784. The visible light polymerizing agent may be any material as long as it has a transmittance that gradually increases from the short wavelength side to the long wavelength side and the wavelength dispersion based on the uneven part and the wavelength dispersion based on the material cancel each other to finally give flat transmission wavelength dispersion. In the case where the wavelength dispersion caused by the uneven part gradually increases from the short wavelength side to the long wavelength side, for example, it is sufficient to select the wavelength dispersion based on the material having a transmittance that gradually decreases from short wavelength side to the long wavelength side. It is not always necessary for the transmittance to uniformly increases or decreases from the short wavelength side to the long wavelength side. The transmittance may randomly increase or decrease, and it is sufficient that the cancellation of the mutual wavelength dispersion finally gives flat transmission wavelength dispersion.

Figure 12:
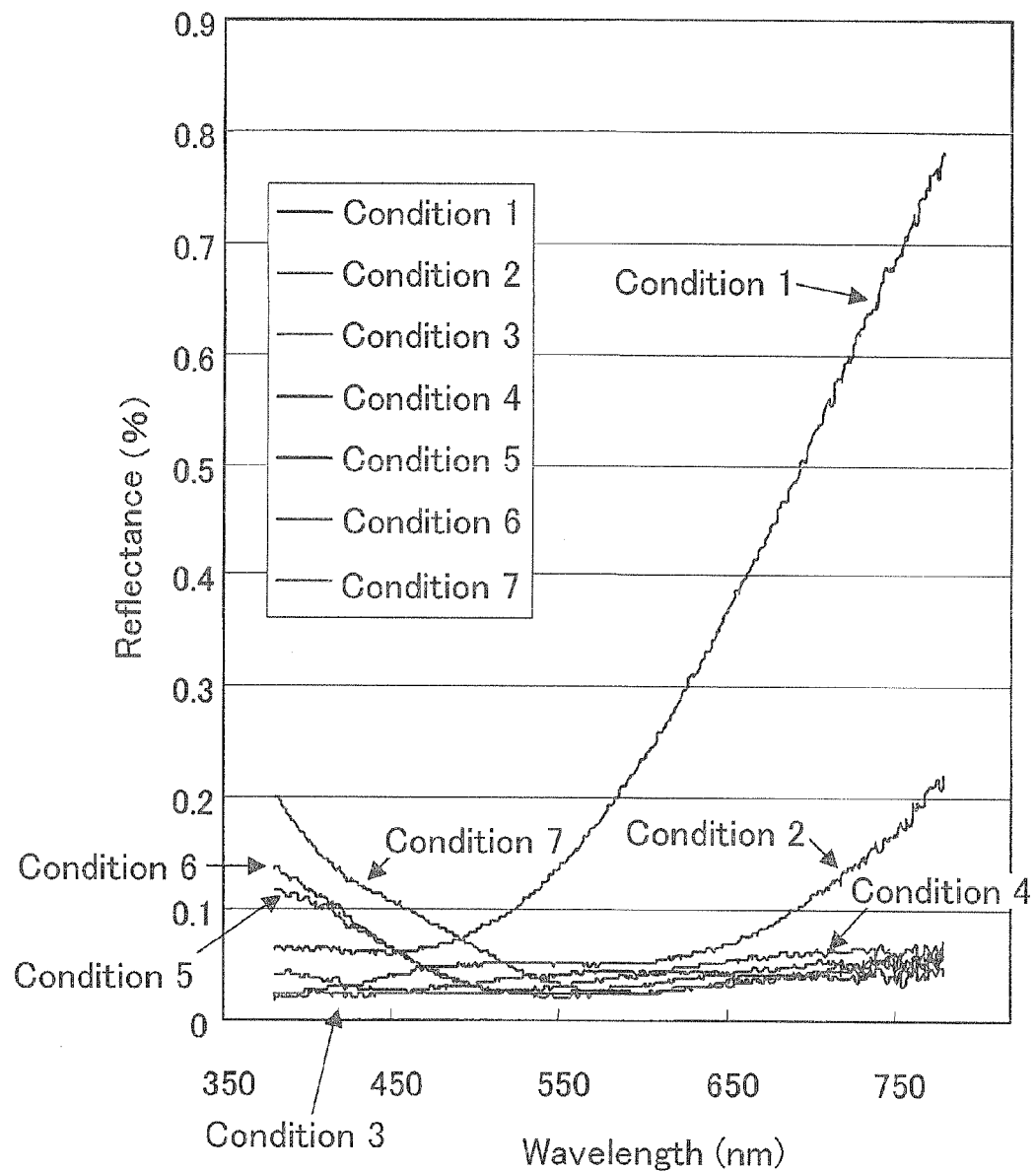
FIG. 12 is a graph that shows the reflectance of each wavelength component in an uneven part in which a plurality of projections having heights of the conditions 1 to 7 is formed.
Figure 13:
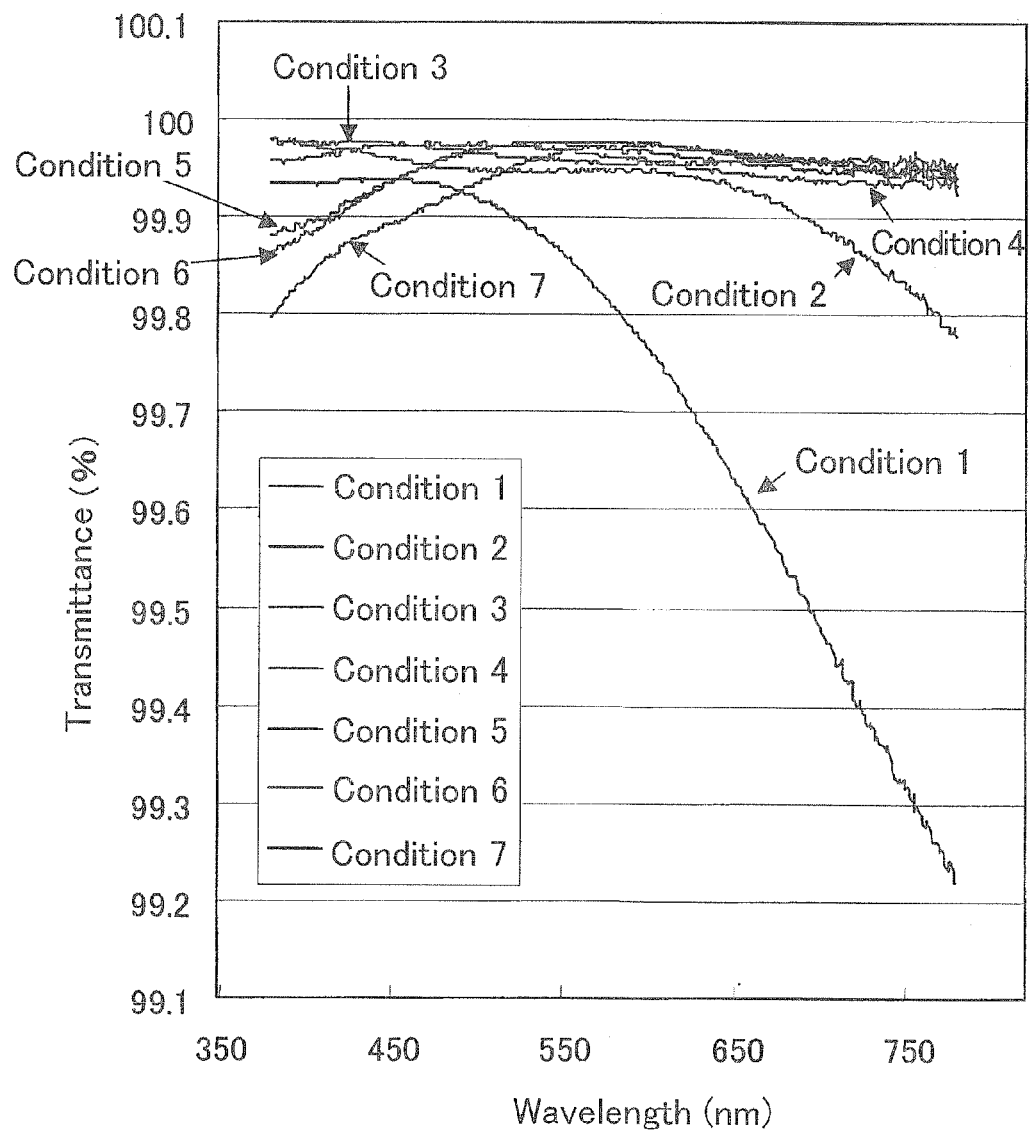
FIG. 13 is a graph that shows the transmittance of each wavelength component in an uneven part in which a plurality of projections having heights of the conditions 1 to 7 is formed.

Seven kinds of samples under different conditions were prepared as the anti-reflective film of Embodiment 1, provided that the height of projections that form the uneven part is used as a parameter. Each pitch (pitch between the tops of adjacent projections) of the uneven part of these seven kinds of samples is the same. The transmittance in the uneven part was calculated from the reflectance in the uneven part as described above. FIG. 12 is a graph that shows the reflectance of each wavelength component in the uneven part in which a plurality of projections with heights of the conditions 1 to 7 is formed. FIG. 13 is a graph that shows the transmittance of each wavelength component in the uneven part in which the plurality of projections with heights of the conditions 1 to 7 is formed. As described above, the transmittance is calculated from the reflectance in the uneven part that forms the upper part of the anti-reflective film. The curve of the reflectance in FIG. 12 is symmetrical to the curve of the transmittance in FIG. 13, with the x axis being a symmetric axis.

The standard light $D_{65}$ is used as a light source in each sample that has projections with heights of the conditions 1 to 7. The object color of each sample is defined based on transmittance characteristics to the weight value coefficient of the XYZ color system of the standard light $D_{65}$. The Y value, x and y values, color temperature, and a* and b* values of the transmitted light were measured. In addition, coloration of each sample was visually observed. As a method of visual observation, there was employed a method of attaching the anti-reflective film (moth-eye film) to a transparent acrylic plate with a roller and observing coloration to transmitted light. Upon preparation of each sample, the conditions were set by using the standard light $D_{65}$ as a reference. Table 1 shows measurement results.

TABLE 1

|  | D65 (Ref) | Condition 1 | Condition 2 | Condition 3 | Condition 4 | Condition 5 | Condition 6 | Condition 7 |
|---|---|---|---|---|---|---|---|---|
| Y value | 100 | 99.3 | 99.95 | 99.96 | 99.97 | 99.97 | 99.97 | 99.96 |
| x | 0.3127 | 0.3121 | 0.3127 | 0.3127 | 0.3127 | 0.3127 | 0.3127 | 0.3128 |
| y | 0.329 | 0.3285 | 0.329 | 0.329 | 0.329 | 0.3291 | 0.3291 | 0.3291 |
| Color temperature | 6504 | 6543 | 6505 | 6505 | 6505 | 6502 | 6503 | 6500 |
| a* | 0.005569 | −0.0583 | 0.0061 | 0.00686 | −0.00223 | −0.00671 | −0.0106 | −0.00359 |
| b* | 0.000706 | −0.3061 | −0.00697 | −0.00923 | −0.00338 | −0.02457 | 0.02328 | 0.0437 |
| Coloration (visual observation) | — | blue | colorless | colorless | colorless | colorless | colorless | light yellow green |
| Comprehensive evalution | — | X | ○ | ○ | ○ | ○ | ○ | Δ |

As shown in FIG. 12 and FIG. 13, the fluctuations were less than 0.5% around the transmittance in a wavelength of 550 nm under each of the conditions 2 to 6, not the condition 1. On the other hand, under the condition 1, the fluctuations were about 0.6% around the transmittance in a wavelength of 550 nm. As shown in Table 1, blue was visually observed in the anti-reflective film having a height of the condition 1. This shows that the fluctuations of the transmittance of each wavelength component were 0.5% or larger around the transmittance in a wavelength of 550 nm. Namely, this shows that in the case where transmission wavelength dispersion is not flat, coloration of the display caused by the anti-reflective film is visually observed.

As shown in FIG. 12 and FIG. 13, under the condition 7, the fluctuations were less than 0.5% around the transmittance in a wavelength of 550 nm, and light yellow green was visually observed. However, the coloration of light yellow green did not have significant effects on the display quality. Under the condition 7, the fluctuations were about 0.2% around the transmittance in a wavelength of 550 nm. Under the condition 2 in which the fluctuations were similarly about 0.2% around the transmittance in a wavelength of 550 nm, favorable display with no coloration was obtained. This shows that even if the fluctuations are about 0.2% around the transmittance in a wavelength of 550 nm, the transmitted light may be colorless under a predetermined condition and lightly colored under other conditions. The difference between the condition 2 and the condition 7 is that the fluctuations were observed on the longer wavelength side (FIG. 13) under the condition 2, and on the shorter wavelength side (FIG. 13) under the condition 7. Under each of the conditions 3 to 6, no coloration was observed, and favorable display was obtained. Under any of the conditions 3 to 6, the fluctuations were less than 0.1% around the transmittance in a wavelength of 550 nm. This shows that in the case where the graph was obtained in which the fluctuations were less than 0.1% around the transmittance in a wavelength of 550 nm, remarkable effects were exerted in removal of coloration. Thus, the fluctuations of the transmittances are at least less than 0.5%, preferably less than 0.2%, and more preferably less than 0.1%.

Figure 14:
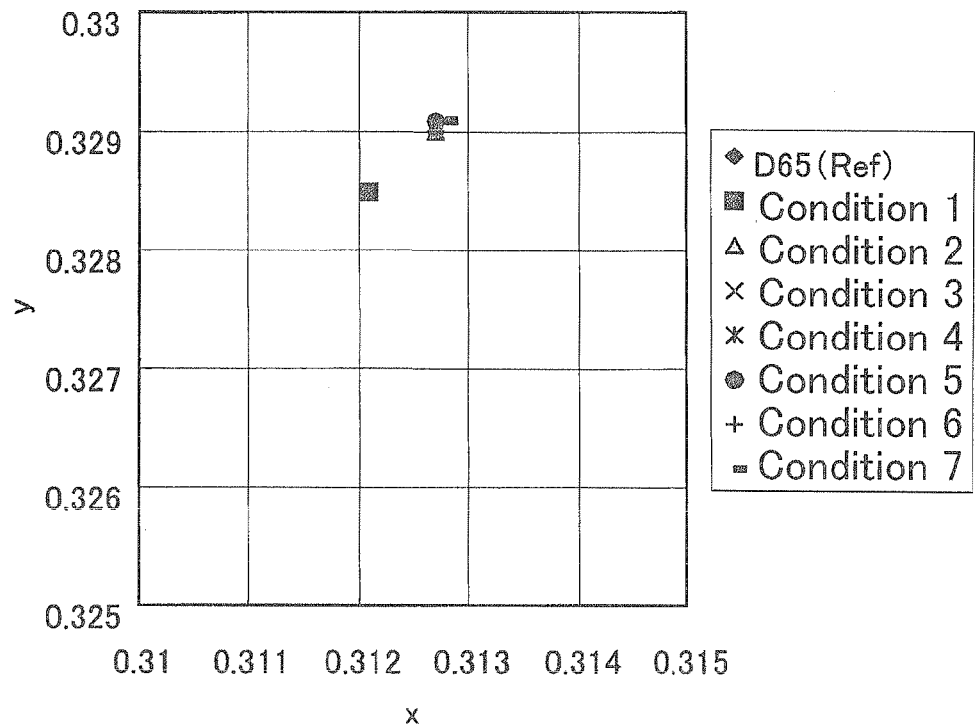
FIG. 14 is a graph that shows an x value and a y value of each sample having heights of the conditions 1 to 7 on an xy chromaticity diagram.

FIG. 14 is a graph that shows an x value and a y value of each sample having heights of the conditions 1 to 7 on the xy chromaticity diagram. As illustrated in FIG. 14, the samples under the conditions 2 to 7 were plotted close to each other, but the sample under the condition 1 was plotted far from the samples under the conditions 2 to 7. FIG. 14 and Table 1 show that if the following equations are satisfied on the xy chromaticity diagram, favorable display with little coloration is obtained.

$$x=0.3127\pm0.0003(0.3124<x<0.3130)$$

$$y=0.329\pm0.0003(0.3287<y<0.3293)$$

The conditions that satisfy the ranges of x and y are the conditions 2 to 6. It is preferable to satisfy the following equations.

$$x=0.3127\pm0.0001(0.3126<x<0.3128)$$

$$y=0.329\pm0.0001(0.3289<y<0.3291)$$

The conditions that satisfy the ranges of x and y are the conditions 2 to 4.

Figure 15:
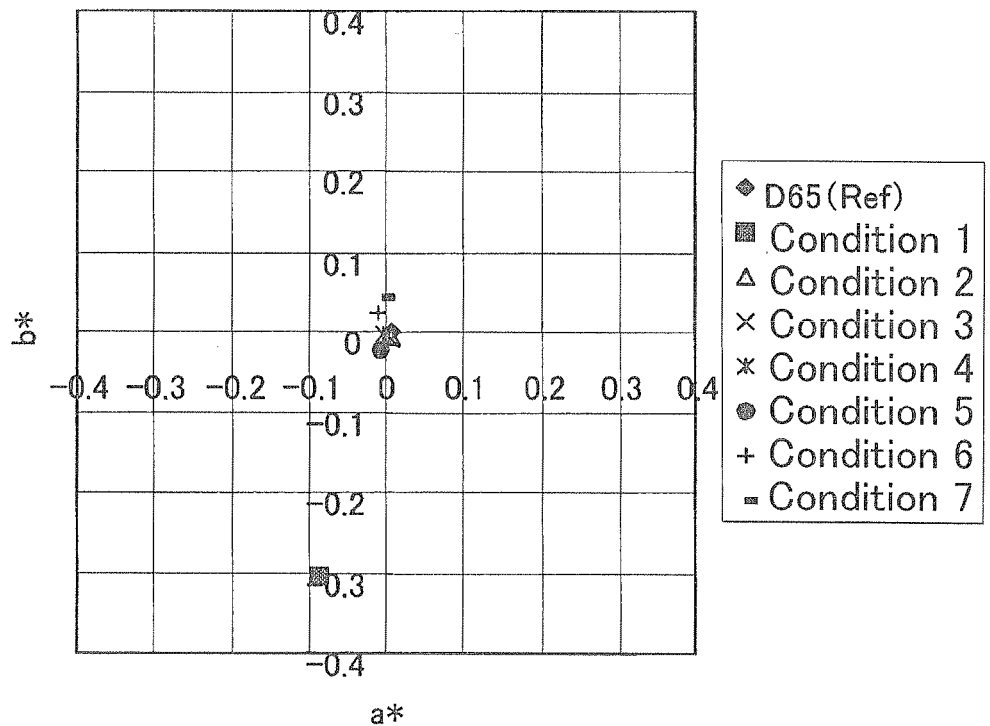
FIG. 15 is a graph that shows an a* value and a b* value of each sample having heights of the conditions 1 to 7 on an a*b* chromaticity diagram.

FIG. 15 is a graph that shows an a* value and a b* value of each sample having heights of the conditions 1 to 7 on an a*b* chromaticity diagram. As illustrated in FIG. 15, the samples under the conditions 2 to 7 were plotted close to each other, but the sample under the condition 1 was plotted far from the samples under the conditions 2 to 7. FIG. 15 and Table 1 show that if the following equations are satisfied on the a*b* chromaticity diagram, favorable display with little coloration is obtained.

$$a^*=0\pm0.05(-0.05<a^*<0.05)$$

$$b^*=0\pm0.05(-0.05<b^*<0.05)$$

The conditions that satisfy the ranges of a* and b* are the conditions 2 to 7. It is preferable to satisfy the following equations.

$$a^*=0\pm0.03(-0.03<a^*<0.03)$$

$$b^*=0\pm0.03(-0.03<b^*<0.03)$$

The conditions that satisfy the ranges of a* and b* are the conditions 2 to 6.

According to the anti-reflective film of Embodiment 1, even if coloration occurs based on the structure of the uneven part as in the condition 1 or the condition 7, the coloration can be removed by adjusting the respective conditions of the material of the anti-reflective film. More specifically, by adjusting the absorption coefficient α(λ) of the light-absorbing medium based on the material of the anti-reflective film, the concentration c of the light-absorbing medium (wavelength dispersion material), and the thickness (light path length) d of the light-absorbing medium forming the base part of the anti-reflective film, the second wavelength dispersion of the material of the anti-reflective film cancels the first wavelength dispersion caused by the structure of the uneven part. Thereby, it is possible to give flat wavelength dispersion characteristics on the entire transmitted light and prevent the coloration. More specifically, the wavelength dispersion of transmitted light based on the aspect ratio (wavelength dispersion structure) is first determined, each parameter that specifies the wavelength dispersion of transmitting light based on the material of the anti-reflective film (wavelength dispersion material) is distributed so as to give flat wavelength dispersion. Then, the Y value, values of x and y, color temperature, and a* and b* values of the transmitted light are set in the range of the above conditions, and thereby favorable display with no coloration can be obtained. The aspect ratio can be calculated by cutting out an evaluation sample, observing the sample with an SEM (Scanning Electron Microscope), and determining the height and pitch of the projection. A spectrum ellipsomter may be used to determine the thickness of the anti-reflective film. The optical spectrum of the reflectance in a visible light range (380 to 780 nm) is determined with the spectral colorimetric meter such as CM-2002, and then the transmittance is calculated. When the structure information of the uneven part (e.g. the height and pitch) and the transmittance caused by the optical spectrum are very different from general structure information and transmittance, the anti-reflective film is expected to have a wavelength dispersion structure or contain a wavelength dispersion material. Examples of the method for analyzing the material of the anti-reflective film include XPS (X-Ray Photoelectron Spectroscopy), MASS (mass spectrometry), Auger electron spectroscopy, and SIMS (Secondary Ion-microprobe Mass Spectrometer). In the case where the IRGACURE784 is used, titanium, a metal complex, is detected.

Figure 16:
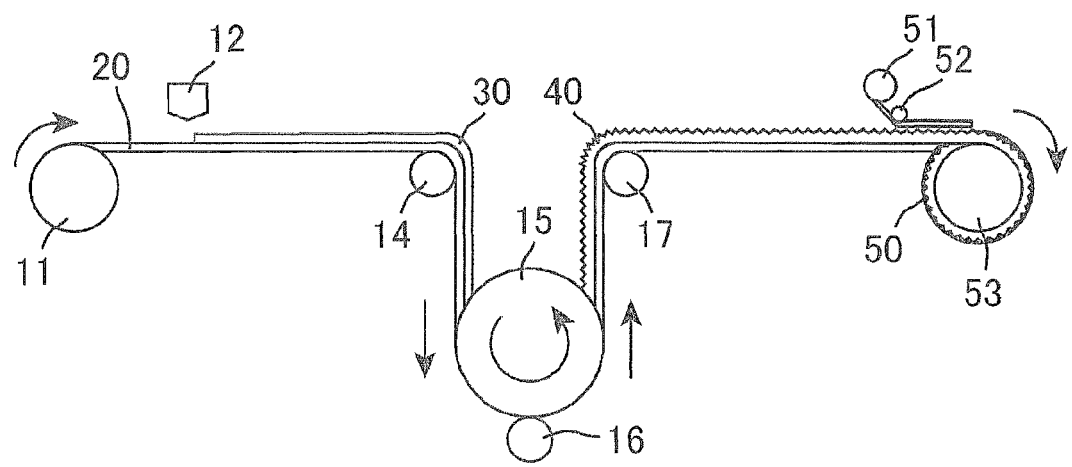
FIG. 16 is a view schematically illustrating the production process of the anti-reflective film of Embodiment 1.

Hereinafter, the production method of an anti-reflective film of Embodiment 1 will be described. FIG. 16 is a view schematically illustrating the production process of the anti-reflective film of Embodiment 1.

Preparation of Substrate

A substrate on which an anti-reflective film is to be mounted is prepared first. The substrate corresponds to a polarizing plate 20 used in LCD devices and the like. The polarizing plate (substrate) 20 has a film structure including three films: a PVA film, which is a polarizer, and a pair of TAC films, which sandwiches the polarizer. The PVA film is stretched in the longitudinal and/or transverse directions and iodine is adsorbed to the PVA film surface and oriented in the stretching direction. At least one of the pair of TAO films contains a UV-absorbing agent. Preferably, both of the pair of TAC films contain a UV-absorbing agent. Examples of the UV-absorbing agent include: organic compounds such as benzophenone compounds, benzotriazole compounds, benzoate compounds, and triazine compounds; and metal oxides such as silicon oxide, titanium oxide, and tin oxide. Such UV-absorbing agents can exist in the TAC film in the form of fine particles, for example. As illustrated in FIG. 16, the polarizing plate 20 is wound to form a substrate film roll 11, and this roll 11 is rotated to feed the polarizing plate 20.

Application Step (First Step)

First, the substrate film roll 11 is rotated to feed the substrate film 20 in the form of a belt in the direction shown by the arrow in FIG. 16. Then the substrate film 20 is coated with a resin material with a die coater 12, thereby forming a film 30. Slit coater, gravure coater, and the like may be employed instead of the die coater.

The coated resin material is composed of a resin curable under visible light irradiation (a resin having a visible light-curing property). Used may be monomers initiating polymerization by visible light absorption, monomers not initiating polymerization by visible light absorption alone but including a polymerization initiator that can become an active species by visible light absorption to initiate polymerization. Examples of the photopolymerization reaction in this case include radical polymerization, cationic polymerization, and the like.

According to radical polymerization, for example, monofunctional(meth)acrylates and/or polyfunctional(meth)acrylates are used as a polymerizable monomer component, and visible light polymerization initiators initiate radical reaction.

Examples of the radical polymerizable monomers include: methyl(meth)acrylate, ethyl(meth)acrylate, styrene, 5-hydroxypentyl(meth)acrylate, 6-hydroxyhexyl(meth)acrylate, 10-hydroxydecyl(meth)acrylate, 3-(meth)acryloyloxyhexyltriethoxysilane, 10-(meth)acryloyloxypropylmethoxysilane, 2,2-bis{4-(meth)acryloxypropoxyphenyl}propane, bisphenol A diglycidyl(meth)acrylate; Bis-GMA, and [2,2,4-trimethylhexamethylenebis(2-carbamoyloxyethyl)]di(meth)acrylate=di(meth)acryloxyethyl-2,2,4-trimethylhexamethylene diurethane; UDMA, ethylene glycol di(meth)acrylate, triethylene glycol di(meth)acrylate, dipentaerythritol di(meth)acrylate, 1,6-hexane di(meth)acrylate, 1,10-decanediol di(meth)acrylate, pentaerythritol tetra (meth)acrylate, trimethylolpropane tri(meth)acrylate, trimethylolethane tri(meth)acrylate, tetramethylolmethane tri (meth)acrylate, 1,7-diacryloyloxy-2,2,6,6-tetraacryloyloxymethyl-4-oxyheptane N,N'-(2,2,4-trimethylhexamethylene)bis[2-(aminocarboxy)propane-1,3-diol]tetramethacrylate and, as urethane tetramethacrylates, 2:1 addition reaction product of 1,3-dimethacryloyloxy-2-hydroxypropane and 2,2,4-trimethyl diisocyanate, 6-(meth)acryloyloxyhexyl 6,8-dithioctanate, and 10-(meth)acryloyloxydecyl 6,8-dithioctanate.

Examples of the visible light polymerization initiator include camphorquinone, benzyl, diacetyl, acetylbenzoyl, α-naphthyl, p,p'-dimethoxybenzyl, 2,3-pentadione, 1,2-phenanthrenequinone, 3,4-phenanthrenequinone, 1,4-phenanthrenequinone, 3,4-phenanthrenequinone, 9,10-phenanthrenequinone, naphthoquinone, trimethylbenzoyl diphenylphosphine oxide, methylxanthone, 10-butyl-2-chloroacridone, and dicyclopentadienyltitanium-di(pentafluorophenyl). These may be used singly or in combination of two or more species of them. Example of the visible light polymerization initiator having a complex system include organic peroxide/dye system, diphenyliodonium salt/dye, imidazole/keto compound, hexaarylbiimidazole compound/hydrogen donor compound, mercaptobenzothiazole/thiopyrylium salt, metal arene/cyanine dye, and hexaarylbiimidazole/radical generator. Examples thereof further include at least one radical generator selected from the group consisting of titanocene, an iron arena complex, organic peroxide, hexaarylbiimidazole, N-phenylglycine, and diaryliodonium salt, and optionally, sensitizing dyes such as 3-substituted coumarin, cyanine dye, merocyanine dye, thiazole dye, and pyrylium dye.

Imprinting Step (Second Step)

The substrate film 20 passes through a pinch roller 14 and then moves halfway around a cylindrical mold roller 15 along its outer circumference surface. At this time, the film 30 on the substrate film 20 is in contact with the outer circumference surface of the mold roller. The mold roller 15 may be a cylindrical body having an outer circumference surface on which a plurality of depressions are formed. The uneven part has a substantially cone or pyramid shape, where a pitch between tops of adjacent bottom points is 50 nm to 500 nm and a depth of a depression is 50 nm to 500 nm. The cylindrical body has 250 mm in inner diameter, 260 mm in outer diameter, and 400 mm in length. Such a mold roller 15 can be prepared by cut-polishing a cylindrical aluminum tube formed by extruding, and alternately repeating several times aluminum anodization and etching for the cut-polished flat surface. The mold roller 15 has seamless nanostructures because the anodization and the etching are performed in the same process for the outer circumference surface of the cylindrical aluminum tube. Use of this mold roller allows a seamless nanosized pattern of an uneven part to be continuously imprinted on the film 30.

A cylindrical pinch roller 16 is arranged to face the outer circumference surface of the mold roller 15 at the position where the substrate film 20 is in contact with the outer circumference surface of the mold roller 15. At this position, the pinch roller 16 presses the film 30 to the mold roller 15, and as a result, the film 30 is embossed with the surface shape of the mold roller 15. Thus, a film 40 with an uneven part formed on its surface is obtained. The substrate film 20 has a width smaller than the length of the mold roller 15 and the pinch roller 16 so that the mold roller 15 and the pinch roller 16 uniformly sandwich the substrate film 20. The pinch roller 16 is a rubber roller. After the uneven part is imprinted on the film 30 surface, the substrate film 20 moves along the outer circumference surface of the mold roller 15 and then passes through the pinch roller 17 to undergo the next step.

Curing (Third Step)

At the same time when the uneven pattern of the mold roller 15 is imprinted on the film 30, the film 40 with the uneven part undergoes a curing treatment. In the production method of the anti-reflective film of Embodiment 1, visible light irradiation is employed as the curing treatment. The irradiation amount of the visible light in the curing treatment needs to be appropriately determined depending on a material to be irradiated with the visible light, but in a range of 300 to 3000 (mJ/cm$^2$), for example. Examples of the light source for the visible light irradiation include a fluorescent lamp, an incandescent lamp, a metal halide lamp, a xenon lamp, a sodium lamp, a halogen lamp, a mercury lamp, a near-infrared lamp, and sunlight. Examples thereof further include visible light lasers such as argon ion laser (488 nm) and FD-Nd/YAG laser. The substrate film 20 has a UV-absorbing property but visible light transmits through the substrate film 20. Accordingly, the curing treatment can be performed from the back side of the film 40 having the uneven part, i.e., the side of the substrate film 20. Thereby, even if the mold roller has light-shielding property as in the production method of the present invention, the film 40 with the uneven part can undergo the curing treatment at the same time when the uneven pattern are formed on the film 30. If an anaerobic material is used for the film 40, it is preferable that the irradiation of the visible light is performed under nitrogen atmosphere. As a result of the curing of the film 40, the uneven part formed on the surface can be fixed. Thus, formation of the anti-reflective film is completed.

Then, a lamination film 50 is unwounded from a lamination roll 51 and pressed to the film 40 by a pinch roller 52, and then attached to the top-side surface of the film 40. Finally, a laminate sheet composed of the substrate film 20, the anti-reflective film, and the lamination film 50 is rolled up to produce a laminate sheet roll 53. The lamination film 50 can protect the sheet surface against dust and damages.

The present application claims priority to Patent Application No. 2008-238051 filed in Japan on Sep. 17, 2008 under the Paris Convention and provisions of national law in a designated State, the entire contents of which are hereby incorporated by reference.

EXPLANATION OF NUMERALS AND SYMBOLS

1: Substrate (TAC film)
2: Anti-reflective film (UV-curable resin layer)
2a: Base part
2b: Uneven part
3: Adhesive layer
11: Substrate film roller
12: Die coater
14, 16, 17, 52: Pinch roller
15: Mold roller
20: Substrate film, polarizing plate (substrate)
30: Film (resin applied in the first step)
40: Film (having an uneven part formed on its surface in the second step and the third step)
50: Lamination film
51: Lamination film roll
53: Laminate sheet roll

The invention claimed is:

1. An anti-reflective film, which reduces reflection of visible light on a surface of a substrate by being mounted on the substrate, comprising:
an uneven part including a plurality of projections;
a base part;
wherein a pitch between tops of adjacent projections of the plurality of projections is a visible light wavelength or shorter;
a rate of a height h from the top to the bottom point of a projection to the pitch p between the tops of adjacent projections of the plurality of projections is $0.5 < h/p < 2.0$;
wherein the uneven part is a wavelength dispersion structure for applying first wavelength dispersion to visible light transmitting through the anti-reflective film,
the anti-reflective film comprises a wavelength dispersion material for applying second wavelength dispersion to the visible light transmitting through the anti-reflective film,
the wavelength dispersion material includes a visible light polymerizing agent having a transmittance that increases from a short wavelength side to a long wavelength side, and
visible light transmitted through the anti-reflective film has flat transmission wavelength dispersion in a visible light region.

2. An anti-reflective film, which reduces reflection of visible light on a surface of a substrate by being mounted on the substrate, comprising:
an uneven part including a plurality of projections;
a base part;
wherein a pitch between tops of adjacent projections of the plurality of projections is a visible light wavelength or shorter;
a rate of a height h from the top to the bottom point of a projection to the pitch p between the tops of adjacent projections of the plurality of projections is $0.5 < h/p < 2.0$;
the uneven part is a wavelength dispersion structure for applying first wavelength dispersion to visible light transmitting through the anti-reflective film,
the anti-reflective film contains a wavelength dispersion material for applying second wavelength dispersion to the visible light transmitting through the anti-reflective film, the wavelength dispersion material includes a visible light polymerizing agent having a transmittance that increases from a short wavelength side to a long wavelength side and transmitted light obtained upon entering the anti-reflective film with light of a standard light source $D_{65}$ is colorless.

3. The anti-reflective film according to claim 1, wherein the wavelength dispersion material is a visible light-curable material.

4. The anti-reflective film according to claim 3, wherein the visible light-curable material includes a visible light polymerization initiator.

5. An anti-reflective film, which reduces reflection of visible light on a surface of a substrate by being mounted on the substrate, comprising:

an uneven part including a plurality of projections;

a base part;

wherein a pitch between tops of adjacent projections of the plurality of projections is a visible light wavelength or shorter;

a rate of a height h from the top to the bottom point of a projection to the pitch p between the tops of adjacent projections of the plurality of projections is $0.5<h/p<2.0$;

the uneven part is a wavelength dispersion structure for applying third wavelength dispersion to visible light upon reflection on the surface of the anti-reflective film, and the anti-reflective film contains a wavelength dispersion material for applying second wavelength dispersion to visible light transmitting through the anti-reflective film, the wavelength dispersion material includes a visible light polymerizing agent having a transmittance that increases from a short wavelength side to a long wavelength side and light has flat wavelength dispersion in a visible light region, the light including visible light reflected on the surface of the anti-reflective film and visible light that is incident from a side of the substrate and transmitted through the anti-reflective film.

6. An anti-reflective film, which reduces reflection of visible light on a surface of a substrate by being mounted on the substrate, comprising:

an uneven part including a plurality of projections;

a base part;

wherein a pitch between tops of adjacent projections of the plurality of projections is a visible light wavelength or shorter;

a rate of a height h from the top to the bottom point of a projection to the pitch p between the tops of adjacent projections of the plurality of projections is $0.5<h/p<2.0$;

the uneven part is a wavelength dispersion structure for applying third wavelength dispersion to visible light upon reflection on the surface of the anti-reflective film and applying first wavelength dispersion to visible light transmitting through the anti-reflective film, the anti-reflective film contains a wavelength dispersion material for applying second wavelength dispersion to the visible light transmitting through the anti-reflective film, the wavelength dispersion material includes a visible light polymerizing agent having a transmittance that increases from a short wavelength side to a long wavelength side and light has flat wavelength dispersion in a visible light range, the light including visible light reflected on the surface of the anti-reflective film and visible light that is incident from a side of the substrate and transmitted through the anti-reflective film.

* * * * *